3,324,103
METHOD OF PREPARING DRY WATER-SOLUBLE ANIMAL BLOOD
Alan L. Lambuth, Bellevue, Wash., assignor to Monsanto Company, St. Louis, Mo., a corporation of Delaware
No Drawing. Filed Aug. 17, 1964, Ser. No. 390,172
2 Claims. (Cl. 260—112)

This invention relates to blood protein adhesives. More particularly, the invention relates to cold press blood protein adhesives and to methods for preparing them.

For some time, blood protein derived from animal blood by careful dehydration has been used as an ingredient of adhesives especially for plywood. The dehydration operation must be carried out carefully to obtain a water-soluble material which can be incorporated in aqueous adhesives. Such adhesives are exclusively hot press adhesives because the heat is necessary for coagulation and setting of the blood. Chemical coagulants are sometimes used but they add to the cost of the adhesive and generally have an adverse effect on the properties of the adhesive.

One object of this invention is to provide a new blood protein adhesive.

A further object is to modify blood protein so that it may be used successfully in cold press adhesives.

These and other objects are attained by heating water-soluble dry blood in the dry state at about 350–500° F. for from 1 to 12 minutes. The blood used is animal blood comprising at least 75% beef blood and has a cold-water solubility, after treatment, of from 15 to 30%.

The following examples are given in illustration and are not intended as limitations on the scope of this invention. Where parts are mentioned, they are parts by weight.

*Example I*

Successive samples of a water-soluble mixture of beef and hog blood comprising 85% by weight of beef blood are heat dried for varying periods of time at various temperatures; all as indicated in Table A, below. The blood is heat dried by depositing the blood in a substantially uniform ⅛" layer on a 30 gage aluminum sheet and placing it into a preheated blower oven.

TABLE A

| Sample No. | Temperature (° F.) | Duration of Heat Treatment | Cold Water (70° F.) Solubility after Heat Treatment, Percent |
|---|---|---|---|
| IA | 350 | 5 minutes | 30 |
| IB | 350 | 10 minutes | 18 |
| IC | 350 | 12 minutes | 15 |
| ID | 400 | 140 seconds | 30 |
| IE | 400 | 150 seconds | 23 |
| IF | 400 | 160 seconds | 15 |
| IG | 450 | 90 seconds | 29 |
| IH | 450 | 100 seconds | 20 |
| II | 450 | 105 seconds | 15 |
| IJ | 500 | 135 seconds | 29 |
| IK | 500 | 155 seconds | 21 |
| IL | 500 | 170 seconds | 15 |

The above results indicate a rather anomalous time-temperature relationship at 500° F. which do not follow the results obtained at the lower temperatures. While the applicant does not intend or desire to be limited by his conjectural explanation of the reason for this anomaly it is believed that this is due to an almost instantaneous dehydration of the blood followed by a denaturing of the blood on an almost linear time-temperature relationship.

*Example II*

In order to determine the efficacy of the heat-treated blood as a plywood adhesive, adhesive compositions are prepared from each of the blood samples obtained in Example I, as follows. Mix together 70 parts of the heat-treated blood, 30 parts of wood flour, 4 parts of pine oil and 308 parts of water at 65° F. until a smooth paste is obtained. Then add 327 parts of water and continue mixing to obtain a smooth lump-free solution. Stir 4 parts of a 50% by weight aqueous sodium hydroxide solution into the aqueous medium and then stir in 10 parts of hydrated lime in 20 parts of water. Finally, add 12 parts of a 50% by weight aqueous sodium hydroxide solution and 35 parts of N-type sodium silicate. As soon as a smooth solution is obtained the adhesive is ready for use. Prepare a series of plywood panels using adhesives prepared from each of blood samples IA through IL (Example I) and test them for shear strength, wood failure and delamination in a 10-cycle water immersion test. The panels should be 13/16" 5-ply laminates. A wet spread of about 140 lbs./MDGL (thousand square feet of double glue line) should be used. Make up panels with varying assembly times and press them for 20 minutes at 75° F. and 175 p.s.i. The shear test (A.S.T.M D906–49) gives results varying between 165 and 200 p.s.i. dry and between 88 and 120 p.s.i. wet. Wood failure in the same tests varies between 30 and 80% with the average about 60%. All of the panels pass the water immersion test for ten full cycles. The water immersion test is carried out by immersing a 6" x 6" test piece of the panel in water at room temperature (70–90° F.) for 4 hours and then drying it at room temperature for 20 hours as a single cycle. After ten such cycles, the panels show substantially no delamination.

*Example III*

Heat dry water-soluble blood (85% beef—15% hog) at 450° F. for 105 seconds to obtain a treated blood of 15% cold water (70° F.) solubility. Prepare an adhesive using the following procedure: Mix together 70 parts of treated blood, 45 parts walnut shell flour, 4 parts pine oil and 308 parts of water at 65° F. until a uniform paste is obtained. Then add 327 parts of water and continue mixing to obtain a smooth lump-free solution. Add 16 parts of a 50% sodium hydroxide solution, and 10 parts of a hydrated lime in 20 parts of water. After a short mix add 35 parts of "N"-type sodium silicate. When a smooth mixture is obtained, the adhesive is ready for use. The viscosity of this mix is 25–30 on the MacMichael 22X wire. This glue has a long usable life characterized by practically no change in viscosity with respect to time. Douglas fir plywood panels prepared with this adhesive in the manner of Example II have the same order of adhesion.

When untreated blood is used in the adhesive formulation, the adhesive is so slippery that on pressing most of the adhesive is forced out from between the plies leaving insufficient glue at the glue line. Furthermore, the blood does not coagulate in the normal cold pressing cycle (70–90° F.) resulting in a poor bond. The cold set bond of the adhesive containing untreated blood is not resistant to the water immersion test.

The blood to be used in the process of this invention is animal blood comprising at least 75% by weight beef blood with the remainder being hog blood and from which the water has been removed, as by spray drying, under carefully controlled temperature conditions so that the dry-blood is still water-soluble. Such dry water-soluble blood is commonly available as a commercial product.

The heat treatment of this invention is designed to denature the water-soluble blood and reduce its cold water, i.e., 70° F., solubility to the order of from 15 to 30%, and preferably 20 to 25%. The blood available varies substantially in its water solubility and composition so that the heat treatment must be controlled as to time and temperature with regard to the peculiarities of each batch of blood. Generally, temperatures of from 350 to 500° F. are used for periods of time ranging from 1 to 12 minutes in order to obtain the desired solubility. Obviously, the higher temperatures require lesser time with continuous operation being possible at temperatures of 450° F. or higher. A preferred time-temperature cycle is 380 to 450° F. for from 3 to 1 minutes.

The treated blood may be used as the sole adhesive component of a plywood glue as shown above or it may be used in combination with soybean or other vegetable protein adhesives in cold press formulations. When used with the vegetable protein, it will impart water-resistance in proportion to the amount of blood used. It may also be used in conjunction with synthetic resin adhesives such as urea and phenolic adhesives to yield a glue which can be given an initial quick set at normal hot press temperatures followed by complete cure of the bond due to the latent heat in the hot stock after the panels are removed from the press.

In preparing adhesives based on the treated blood as the main adhesive constituent, the formulation and procedure shown in Example II or Example III may be followed. The essential limitations are that the solution should be alkaline and that the temperature of the water used during the preparation of the glue should be controlled. For alkalinity, sodium hydroxide or a combination of sodium hydroxide and calcium hydroxide is preferable, although alkalis such as potassium, lithium and ammonium hydroxides may be used. The temperature of the water may be varied between 60 and 130° F. This temperatures will be a factor in controlling the initial viscosity and the usable life of the glue. Temperatures in the higher end of the permissible range lower the initial viscosity and lengthen the usable pot life.

For most applications, it is desirable to include in the adhesive formulations an inert filler such as wood flour, bark flour, nut shell flours, grass family by-products, alpha flock, etc. and an anti-foamer such as pine oil. The proportions of these materials are not critical and may be varied to suit the particular conditions under which the glue is to be used. Other conventional additives may be used.

It is obvious that many variations may be made in the products and processes set forth above without departing from the spirit and scope of this invention.

What is claimed is:

1. A process for preparing a dry base suitable for preparing cold press adhesives which comprises heating dry water-soluble animal blood at from 350 to 500° F. for from 12 to 1 minutes under substantially anhydrous conditions; said animal blood comprising at least 75% beef blood with the remainder being hog blood and having a cold-water solubility, after treatment, of from 15 to 30%.

2. A process as in claim 1 wherein the animal blood is heated at from 380 to 450° F. for from 3 to 1 minutes.

References Cited

UNITED STATES PATENTS

| | | | |
|---|---|---|---|
| 3,058,835 | 10/1962 | Sheeran | 106—161 |
| 3,095,313 | 6/1963 | Cone | 106—124 |
| 3,095,571 | 6/1963 | Cone | 106—124 |
| 3,123,593 | 3/1964 | Allan et al. | 106—124 |

ALEXANDER H. BRODMERKEL, *Primary Examiner.*

MORRIS LIEBMAN, D. J. ARNOLD,

*Assistant Examiners.*